United States Patent Office 3,451,956
Patented June 24, 1969

3,451,956
POLY (AMIDE-UREA) RESIN
Jack L. Harrier, Lansing, and Lawrence D. Spaulding, Park Forest, Ill., assignors to Standard Oil Company, Chicago, Ill., a corporation of Indiana
No Drawing. Filed Nov. 1, 1966, Ser. No. 591,083
Int. Cl. C08g 22/04; C09d 3/64
U.S. Cl. 260—22
10 Claims

ABSTRACT OF THE DISCLOSURE

Oil-modified poly (amide-urea) resins, suitable for use as air-dry coatings, are prepared from unsaturated non-hydroxylated triglycerides, non-anhydride-forming organic dicarboxylic acids, and organic polyisocyanates by a two-stage process wherein the triglyceride and the acid are first reacted to form an acidolysis reaction product mixture which is then reacted with the polyisocyanate.

---

This invention relates to oil-modified resins suitable for use as air-dry coatings. More particularly it relates to novel poly (amide-urea) resin compositions derived from unsaturated triglycerides, organic dibasic acids, and organic polyisocyanates.

Clear exterior and interior wood finishes are in demand by the coatings industry. Oil-modified urethane varnishes have gained wide acceptance in this area because of their fast dry characteristics and above average solvent resistance. Urethane varnishes, however, have poor resistance to certain solvents and poor caustic resistance. Accordingly, the coatings industry is seeking resins that will form clear coatings without the deficiencies of the desirable urethane varnishes.

The present invention provides an oil-modified resin that is comparable or superior to urethane varnishes in chemical and solvent resistance, and speed of dry. The oil-modified resins of this invention are broadly referred to as poly (amide-urea) resins for amide and urea linkages are formed during the reaction of the unsaturated triglyceride, organic dibasic acid and polyisocyanate reactants.

These novel resins, having an oil length of about 60–80, consist of the reaction product of (A) unsaturated non-hydroxylated triglyceride containing at least 25 carbon atoms in the molecule and having an iodine value of at least 10, (B) non-anhydride-forming organic dicarboxylic acid having at least 4 carbon atoms, and (C) organic polyisocyanate containing at least two isocyanate groups, wherein the equivalent ratio of B:C is 1:1–1.25 and the amounts of said reactants are selected so that reactant A constitutes about 60–80 weight percent and the reaction residue of reactants B and C constitute about 20–40 weight percent of said reaction product; said reaction product formed by first reacting said triglyceride and said dicarboxylic acid at a temperature of about 450–600° F. for a period of from about 10 minutes to about 3 hours to effect transacidolysis and form an acidolysis reaction product mixture, and then reacting said acidolysis mixture and said polyisocyanate at a temperature of about 300–450° F. for a period of about 1–6 hours to form said resin.

The triglyceride (reactant A) can be any unsaturated non-hydroxylated synthetic or natural triglyceride containing at least 25 carbon atoms in the molecule and having an iodine value of at least 10. The preferred triglycerides are the natural drying or semi-drying oils of vegetable or marine origin, such as linseed, soybean, tung, dehydrated castor, coconut, cottonseed, rapeseed, perilla, corn, safflower, herring, sardine, and menhaden, etc. Safflower oil is preferred for its non-yellowing characteristics. Synthetic triglycerides can be formed by the esterification of glycerol with appropriate saturated and unsaturated acids to form the appropriate synthetic drying or semi-drying oil, provided the resultant triglyceride has an iodine value of at least 10 and contains a minimum of 25 carbon atoms. The simplest synthetic triglyceride is glycerol diacetate mono-oleate. It will be apparent to one skilled in the art that any desired triglyceride can be synthesized for use in this invention.

The dibasic reactant can be any organic aliphatic or aromatic dicarboxylic acid, having at least four carbon atoms, or mixture of acids, that will not form an anhydride thereof at reaction temperatures. Illustrative of such acids are adipic, azelaic, fumaric, isophthalic, terepthalic, naphthalene dicarboxylic acids, halogenated isophthalic acids, dimer acids, and phenylindane dicarboxylic acid (1,1,3-trimethyl-5-carboxyl - 1 - (p - carboxyphenyl) indan). Preferably the dibasic acid reactant comprises about 70–100% isophthalic acid.

The organic polyisocyanate constituent can be an aliphatic or aromatic or mixed aromatic-aliphatic polyisocyanate containing at least 2 isocyanate groups. Illustrative of such compounds are polymethylene diisocyanates, hexamethylene diisocyanate, diphenyl methane diisocyanate, hydrogenated diphenyl methane diisocyanate, polyphenyl methane isocyanate, polyethylene phenylene diisocyanate, tolylene (toluene) diisocyanate, dimer acid diisocyanates obtained from dimerized linoleic or soybean fatty acids, m- and p-xylene diisocyanates and mixtures thereof.

The resins of this invention are formulated in accordance with known techniques to provide an oil content of about 60–80 wt. percent in the finished resin. Inasmuch as carbon dioxide is the by-product of the reaction between the hereindescribed reactants, the balance of the resin, about 20–40 wt. percent, is the reaction residue of the dibasic acid-polyisocyanate reactants. Accordingly, the amounts of the dibasic acid and polyisocyanate reactants used are determined by an equivalent ratio of carboxyl to isocyanate groups of 1:1–1.25, preferably 1:1–1.1, so as to provide 20–40 wt. percent in the finished resin.

The preparation of the resins of this invention is effected by a two-stage process. In the first stage, an acidolysis reaction product mixture is formed by reacting, with agitation, the triglyceride and dibasic acid at a temperature of about 450–600° F. for a period of about 10 minutes to about 3 hours. In the second stage, the polyisocyanate is slowly added, with agitation, to the first stage reactive product mixture, while maintaining a reaction temperature of the mixture at about 300–450° F., for a period of about 1–6 hours with the evolution of carbon dioxide, until a single phase homogeneous solution has been obtained. Thereafter, the resin is cooled and thinned with organic solvent to the desired NVM (non-volatile matter) content.

The organic solvent solutions of the resins prepared as above, can be used as clear or pigmented air-dry coatings with the addition of appropriate driers, the preferred driers are the conventional cobalt and lead paint driers in amounts of about 0.05 wt. percent cobalt and 0.15 wt. percent lead for resin solutions containing about 40–50% resin NVM solids. Organic solvents suitable for the formation of the coatings are those conventionally used for oil-modified alkyd resinous coatings, such as mineral spirits, VM&P naphtha, aliphatic and aromatic hydrocarbons. It has been found advantageous to include small amounts; 1–20%, of the ether glycol acetates as co-solvents to improve the brushability of the coating.

EXAMPLE 1

A mixture of 660 gms. of non-break (unrefined) safflower oil and 216 gms. of a mixture of 70 parts isophthalic acid and 30 parts terephthalic acid were charged to a resin kettle equipped with agitator, thermometer and inert gas sparge. The mixture was heated to 540° F. and held by 1.5 hours. Thereafter, the acidolyisate mixture was cooled to 360° F. and 239 gms. toluene diisocyanate (TDI) added dropwise, with evolution of carbon dioxide, over a period of 45 minutes. The equivalent ratio of carboxyl:isocyanate groups was 1:1.05. After the TDI was added, the mixture was held at 360° F. for one hour. Then the temperature of the mixture was raised to 410° F. and held thereat for 30 minutes. Approximately 1,000 gms. of a clear single phase resin solution was obtained which was cooled and thinned to 40–50% NVM with a 90/10 blend of mineral spirits/ethoxyethanol acetate. The thinned resin was then ready for use as a clear coating by the addition of 0.05 wt. percent cobalt and 0.15 wt. percent lead driers.

EXAMPLE 2

A 66 oil length resin was prepared as in Ex. 1 with the substitution of a 97/3 mixture of isophthalic/terephthalic acid for the acid mixture of Ex. 1.

EXAMPLE 3

The resin of this example was prepared as in Ex. 1 using 100% isophthalic acid as the dibasic acid reactant to form a similar 66 oil-length resin.

EXAMPLE 4

A 70 oil length resin was prepared by reacting 700 gms. safflower oil, 198 gms. of a 70/30 mixture of isophthalic/terephthalic acid, and 208 gms. of tolulene dissocyanate in the manner described in Ex. 1. The carboxyl:isocyanate equivalent ratio being 1:1.

EXAMPLE 5

Another 70 oil length resin, similarly prepared, wherein the carboxyl:isocyanate ratio was 1:1.1 was formed by reacting 700 gms. safflower oil, 185 gms. of 70/30 mixture of isophthalic/terephthalic acid, and 213 gms. of toluene diisocyanate.

EXAMPLE 6

In the manner described in Ex. 1, a 66 oil length resin was prepared by reacting 660 gms. safflower oil, 262 gms. phenylindane dicarboxylic acid, and 149 gms. toluene diisocyanate. The carboxyl:isocyanate equivalent ratio being 1:1.05.

The film forming and performance characteristics of the resins of this invention were determined by spraying the thinned coatings of the examples on glass and cold rolled steel panels to give a 2 mil wet thickness film. Dry-times were run on 2 mil drawdowns on glass by conventional testing methods to determine set-to-touch, tack-free, and dry-hard values. All films were set-to-touch in 20–45 minutes; tack-free and dry-hard in about 3–6 hours. In the conventional 4 hour spot test for chemical and solvent resistance, coated steel panels after 7 day air-dry showed that the films were resistant to xylene, mineral spirits, 50% ethanol, 5% sodium hydroxide, and water; whereas similar films from a commercial urethane varnish either blistered or lifted from the metal substrate.

The poly (amide-urea) resins of the invention show similar behavior to commercial urethane varnishes with respect to sandability, penetration, and leveling. Films can generally be sanded and recoated in 4–5 hours. After sanding, the surface can be buffed back to a high luster using conventional rubbing compounds.

We claim:
1. A poly (amide-urea) resin having an oil length of about 60–80 consisting of the reaction product of (A) unsaturated nonhydroxylated triglyceride containing at least 25 carbon atoms in the molecule and having an iodine value of at least 10, (B) non-anhydride-forming organic dicarboxylic acid having at least 4 carbon atoms, and (C) organic polyisocyanate containing at least two isocyanate groups, wherein the equivalent ratio of B:C is 1:1–1.25 and the amounts of the reactants are selected so that reactant A constitutes about 60–80 weight percent and the reaction residue of reactants B and C constitute about 20–40 weight percent of said reaction product; said reaction product formed by first reacting said triglyceride and said dicarboxylic acid at a temperature of about 450–600° F. for a period of from about 10 minutes to about 3 hours to effect transacidolysis and form an acidolysis reaction product mixture, and then reacting said acidolysis mixture and said polyisocyanate at a temperature of about 300–450° F. for a period of about 1–6 hours to form said resin.

2. The resin of claim 1 wherein (A) is a natural drying or semi-drying oil.

3. The resin of claim 1 wherein (A) is a vegetable drying oil.

4. The resin of claim 1 wherein (A) is safflower oil.

5. The resin of claim 1 wherein (B) comprises 70–100% isophthalic acid.

6. The resin of claim 1 wherein (B) is phenylindane dicarboxylic acid.

7. The resin of claim 1 wherein (C) is tolylene diisocyanate.

8. The resin of claim 1 wherein (A) is safflower oil; (B) comprises 70–100% isophthalic acid; and (C) is tolylene diisocyanate.

9. The resin of claim 1 wherein (A) is safflower oil; (B) is phenylindane dicarboxylic acid; and (C) is tolylene diisocyanate.

10. The resin of claim 1 wherein (A) is about 66–70 wt. percent safflower oil; (B) is a mixture of 3–30 wt. percent terephthalic acid and 70–97 wt. percent isophthalic acid, and (C) is tolylene diisocyanate, and the ratio of (B):(C) is 1:1–1.1.

References Cited

UNITED STATES PATENTS 3,183,109   5/1965   Neumann et al. _____ 260—18 X
3,246,049   4/1966   Webber _____ 260—22 X

OTHER REFERENCES

Polyurethanes: Chemistry & Technology, vol. II, Saunders et al, Interscience Pub., 1964, page 554 (copy in scientific library).

DONALD E. CZAJA, Primary Examiner.

C. W. IVY, Assistant Examiner.

U.S. Cl. X.R.

260—31.4, 33.6